Oct. 4, 1927.

C. M. RODGERS

ARTIFICIAL BAIT

Filed July 10, 1926

1,644,151

INVENTOR.
Claude M. Rodgers.
BY
ATTORNEY.

Patented Oct. 4, 1927.

1,644,151

UNITED STATES PATENT OFFICE.

CLAUDE M. RODGERS, OF PORTAGE TOWNSHIP, ST. JOSEPH COUNTY, INDIANA, ASSIGNOR TO SOUTH BEND BAIT CO., A CORPORATION OF INDIANA.

ARTIFICIAL BAIT.

Application filed July 10, 1926. Serial No. 121,560.

The invention relates to artificial baits and has for its object to provide a device of this character having an upwardly and forwardly inclined deflecting plate, to which the lead wire is directly connected and means whereby a pork rind or other flexible member may be connected to the lead wire rearwardly of the deflecting plate, and which pork rind extends rearwardly to a position over the hook, thereby forming a guard as well as means for obscuring the hook.

A further object is to provide a fish lure deflecting plate with means whereby the lead wire may be attached to the same and also a pork rind or other flexible member, which pork rind forms a guard for a hook, and also obscuring means for the hook as the bait is moved through the water.

A further object is to dispose the rind and lead wire above the body of the bait where the rind will occupy a position above the hook as the bait is moved through the water, thereby acting as a guard for the hook of the bait, as well as obscuring means during the wobbling of the bait.

A further object is to connect the lead wire to the deflecting plate by providing an eye in the lead wire which eye extends through spaced apertures in the deflecting plate and to connect the pork rind to said eye rearwardly of the deflecting plate.

A further object is to provide a fish bait comprising a body member having a deflecting plate extending upwardly from the forward end thereof, to which a lead wire is connected, a flexible member connected to the lead wire rearwardly of the plate and extending to a position rearwardly of the body member and over the fluke of the hook, the shank of which hook extends axially into the rear end of the body. A still further object is to provide a hackle which is secured to the rear end of the body by a wrapping about said rear end.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1:
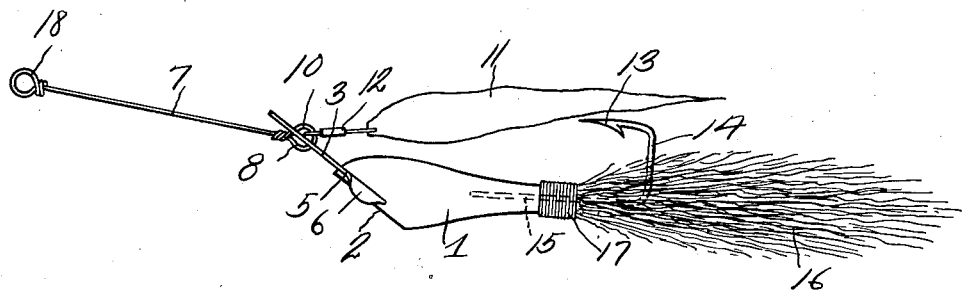
Figure 1 is a side elevation of the artificial bait.
Figure 2:
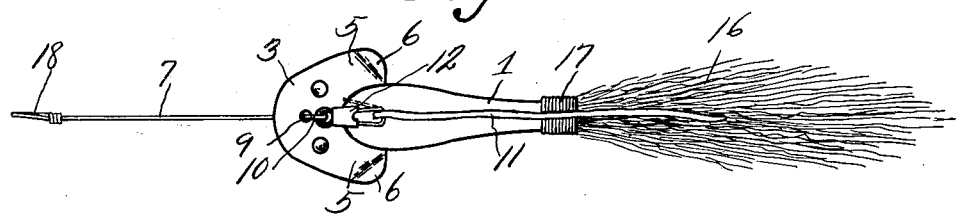
Figure 2 is a top plan view of the bait.
Figure 3:
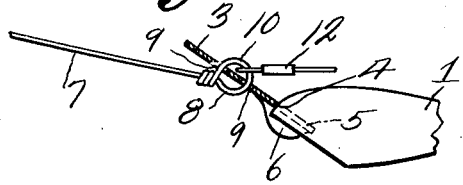
Figure 3 is a side elevation of the forward end of the bait body, showing the deflecting plate in vertical longitudinal section.
Figure 4:
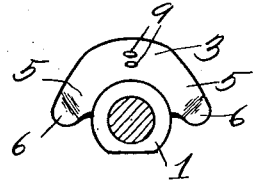
Figure 4 is a vertical transverse sectional view through the bait body looking towards the deflecting plate.

Referring to the drawing, the numeral 1 designates the body of the bait which is preferably formed from metal, for instance brass, so as to have sufficient weight to provide a deep travelling bait, however applicant does not limit himself to a metallic bait body or to a deep diving bait. The forward end 2 of the bait body inclines forwardly and upwardly and arching the upper side of the bait body 1 is a deflecting plate 3, which is in a plane parallel to the plane of the end 2 of the bait body and is preferably secured to the bait body at 4 by brazing. Deflecting plate 3 is provided at opposite sides of the forward end of the bait body with extensions 5 which extend beyond the sides of the bait body and have their outer edges provided with downwardly extending flanges 6, which flanges, as the bait is drawn through the water causes a wobbling of the bait as a whole. Heretofore the lead wire 7 in artificial bait of this general character has been attached to the bait body 1, however in the present instance the lead wire 7 is provided with a loop 8, which loop extends through spaced apertures 9 in the deflecting plate and the portion 10 thereof projects rearwardly of the deflecting plate in a position where a flexible member 11 may be easily attached thereto by means of a snap hook 12, which snap hook may be of any construction desired. The flexible member 11 is disposed above the bait body 1 and extends preferably beyond the rear end of the bait body and above the bait body where it will act as a guard for the fluke 13 of the hook 14, and also by being disposed above the bait body during the wobbling of the bait wobbles in a lateral plane above the fluke 13, thereby obscuring the fluke from view of a fish.

Hook 14 is provided with a shank 15 which extends axially into the rear end of the bait body 1 and may be secured in position, where a metal body is used, by soldering. The hackle 16 is secured peripherally to the rear end of the bait body 1 by means of a wrapping 17, however the initial securing of the hackle may be accomplished by adhesively securing the same with shellac and the wrapping shellacked after it is placed in position.

In operation a line is attached to the eye 8 of the lead wire 7, and after a casting operation the bait is drawn through the water, and as the bait 1 is relatively heavy it assumes a relatively deep position. As the bait is drawn through the water the plate 3 and flanges 6 cause said bait to wobble from side to side incident to the resistance of the water. It will be noted that the flexible member 11 which is preferably formed from pork rind is disposed above the bait body 1 and will wobble from side to side above the fluke 13, thereby acting as a guard for preventing grass or weeds from gathering on the hook and at the same time more or less obscures the hook from the sight of a fish.

From the above it will be seen that a fish bait is provided which is simple in construction, the flexible member secured directly to the lead wire, and the lead wire is connected directly to the deflecting plate, thereby providing an extremely simple construction, as well as positioning the flexible member where it will act as a guard for the hook, as well as means for obscuring the hook.

The invention having been set forth what is claimed as new and useful is:—

1. The combination with a bait body having a deflecting plate, of a lead member connected to said deflecting plate and a flexible member connected to said lead member and disposed rearwardly of the plate.

2. The combination with a bait body, an upwardly and forwardly inclined deflecting plate, a lead member connected to said deflecting plate and a flexible member connected to said lead member rearwardly of the plate.

3. The combination with a bait body, an upwardly extending deflecting plate carried by said bait body, a hook carried by the rear end of said bait body and having its fluke upwardly disposed, of a lead member connected to said deflecting plate and disposed forwardly thereof, and a flexible member connected to the lead member rearwardly of the plate.

4. The combination with a bait body having an upwardly extending hook at its rear end and an upwardly extending plate at its forward end, of a lead member connected to said plate above said body, a flexible member connected to said lead member and extending rearwardly above the bait body, said flexible member terminating above the hook.

5. The combination with a bait body having an upwardly extending hook at its rear end and an upwardly extending plate at its forward end, a lead member connected to said plate, and a flexible member connected to said lead member rearwardly of the plate and extending rearwardly above the bait body and hook in substantially the plane of the hook.

6. The combination with a bait body having an upwardly extending hook at its rear end and an upwardly extending plate at its forward end, wobbling means for said bait body, a lead member connected to said plate and extending through the plate and a flexible member connected to said lead member rearwardly of the plate.

7. The combination with a bait body having an upwardly extending deflecting plate, a hook at the rear end of said bait body, of a lead member, an eye carried by said lead member and extending through spaced apertures in the plate thereby projecting beyond the rear side of the plate and a flexible member connected to said eye rearwardly of the plate.

8. The combination with a bait body having an upwardly extending deflecting plate at the forward end thereof and a hook at the rear end thereof, a lead member forwardly of the plate and connected to said plate, of a flexible member disposed rearwardly of the plate and connected to the lead member.

9. The combination with a fish bait comprising a body, a deflecting member carried by said body, of a lead member connected directly to said deflecting member and disposed at one side thereof and a flexible member connected to said lead member and disposed to the opposite side of the deflecting member.

10. The combination with a fish bait body having an upwardly extending member, a lead member connected to said upwardly extending member and extending partially therethrough and a flexible member connected to said lead member at the opposite side of the upwardly extending member.

11. The combination with a lead member, a flexible member connected to said lead member, a bait body disposed beneath the flexible member, a hook carried by said bait body and an upwardly extending member carried by the bait body and connected to the lead member adjacent its point of connection with the flexible member.

12. The combination with a fish bait having an upwardly extending deflecting member, a hook carried by the body of the bait, a lead member forwardly of the deflecting member, an eye carried by the lead member, said eye extending through apertures of the deflecting member, a flexible member above the bait body and hook, and attaching means between the flexible member and the eye of the lead member.

13. The combination with a bait body, a deflecting plate carried by the forward end of the body, and a flexible member connected to said deflecting plate at a point forwardly of and extending rearwardly adjacent the bait body.

14. The combination with a bait body, an upwardly and forwardly inclined deflecting plate carried by the forward end of said body, and a flexible member connected to said deflecting plate at a point forwardly of the bait body and extending rearwardly over said body.

In testimony whereof I affix my signature.

CLAUDE M. RODGERS.